United States Patent [19]

Suzuki et al.

[11] Patent Number: 5,140,579
[45] Date of Patent: Aug. 18, 1992

[54] DISK LOADING DEVICE FOR DISK PLAYER

[75] Inventors: Shoji Suzuki; Kenji Yatsu, both of Iwaki, Japan

[73] Assignee: Alpine Electronics Inc., Tokyo, Japan

[21] Appl. No.: 597,935

[22] Filed: Oct. 15, 1990

[30] Foreign Application Priority Data

Oct. 16, 1989 [JP] Japan .................................. 1-268662
Nov. 1, 1989 [JP] Japan .................................. 1-285419

[51] Int. Cl.⁵ ........................ G11B 33/02; G11B 17/22
[52] U.S. Cl. .................................... 369/77.1; 369/75.2; 369/36
[58] Field of Search .................. 369/75.1, 75.2, 77.1, 369/77.2, 38, 39, 292, 34, 36, 178, 191, 194; 360/99.02, 99.06; 235/479

[56] References Cited

U.S. PATENT DOCUMENTS

| | | | |
|---|---|---|---|
| 4,479,210 | 10/1984 | Nakayama | 369/75.2 X |
| 4,592,039 | 5/1986 | Toyoguchi et al. | 369/75.2 |
| 4,691,309 | 9/1987 | Suzuki | 369/38 |
| 4,701,900 | 10/1987 | Hasegawa et al. | 369/38 X |
| 4,797,865 | 1/1989 | Imai et al. | 369/39 |
| 4,797,869 | 1/1989 | Hirano | 369/75.2 |
| 4,799,209 | 1/1989 | Grobben | 369/75.2 |
| 4,829,504 | 5/1989 | Sunaga et al. | 369/292 X |
| 4,841,499 | 6/1989 | Takahashi et al. | 369/38 |

*Primary Examiner*—Stuart S. Levy
*Assistant Examiner*—Joseph A. Rhoa
*Attorney, Agent, or Firm*—Guy W. Shoup; David H. Carroll; Edward C. Kwok

[57] ABSTRACT

A cartridge loading device for a disk player which can supply, when a disk tray on which a disk is placed is accommodated in position into a device body of the disk player, the disk readily to a disk driving unit located laterally of an area of advancing and retracting movement of the disk tray. The disk loading device comprises a slide table mounted for advancing and retracting movement from and into a device body, a disk tray supported for movement in a direction perpendicular to the direction of movement of the slide table to and from a projected position at which it is projected from the slide table, a disk feeding mechanism disposed adjacent the projected position of the disk tray for drawing out the disk tray and a disk received on the disk tray from the slide table to the projected position, a discharging mechanism for pushing out the disk tray from the slide table to the disk feeding mechanism, a disk driving unit for driving a disk on the disk tray drawn out by the disk feeding mechanism, and a lift table for carrying the disk driving unit thereon and moving the disk driving unit upwardly and downwardly.

15 Claims, 9 Drawing Sheets

DISK LOADING DEVICE FOR DISK PLAYER

BACKGROUND OF THE INVENTION

1. Field of the Invention

This invention relates to a disk loading device for placing a disk in position onto a turntable of a disk driving section of an optical disk player or the like, and more particularly to a disk driving device suitable for use in a player wherein a disk driving section is disposed in a direction crossing to the direction of advancing and retracting movement of a slide table having a disk tray.

2. Description of the Related Art

Some of disk players into which a disk, such as a compact disk, is to be loaded are constructed such that the disk tray, on which a disk is to be placed, is advanced from and retracted into a device body. In a player of the type just mentioned, when the disk tray is projected outwardly from the device body, a disk can be placed onto the disk tray, and then after the disk tray is retracted into the device body, the disk is clamped between a turntable and a clamp member in a driving unit for playing the disk. Such a disk player is described in U.S. Pat. No. 4,799,209, entitled "Clamping Device for Clamping an Optical Disc onto a Drive Spindle" by H. Grobben, issued Jan. 17, 1989.

Some recent compact disk players for use in a car include a disk changer in which a cartridge holding a plurality of disks is loaded in position and one of the disks is drawn out from the cartridge and played. Such a disk player is described in U.S. Pat. No. 4,691,309, entitled "Magazine for Disc in Holders and Combination of a Disc-Player with such a Magazine" by Y. Suzuki, issued Sep. 1, 1987. In general, but particularly where a player which includes a disk changer is used for the domestic use, it is required to include not only a mounting section for a cartridge but also a disk tray on which a single disk can be supplied quickly into the player.

SUMMARY OF THE INVENTION

It is an object of the present invention to provide a cartridge loading device for a disk player to move a disk from the disk tray readily to a disk driving unit located on one side of the area of advancing and retracting movement of the disk tray.

In accordance with the present invention, there is provided a disk loading device for a disk player, which comprises a slide table mounted for advancing and retracting from and into a device body, a disk tray supported for moving in a direction perpendicular to the direction of movement of the slide table to and from a projected position at which the disk tray is projected from the slide table, the disk tray having a disk receiving portion formed on an upper face thereof, a disk feeding mechanism disposed adjacent the projected position of the disk tray for drawing out the disk tray and a disk received on the disk receiving portion of the disk tray from the slide table to the projected position, a discharging mechanism for pushing out the disk tray from the slide table to the disk feeding mechanism, and a disk driving unit for driving a disk on the disk tray drawn out by the disk feeding mechanism. The disk loading mechanism may further comprise a lift table for carrying the disk driving unit thereon and moving the disk driving unit upwardly and downwardly.

With the disk loading device, a disk is placed onto the disk tray on the slide table in the projected position in which the slide table is projected from the device body. Then, the slide table is retracted into the device body, and then, the disk tray located on the slide table is pushed out laterally together with the disk received thereon and is fed into the disk driving unit carried on the lift table together with the disk. Then, the disk is played in the disk driving unit. In this manner, the disk is fed to a predetermined final position while it is kept positioned on the disk tray. Accordingly, even if a disk driving mechanism is located outside the area in which the slide table is advanced and retracted, the disk can be loaded in position so that it may be played with certainty.

The disk loading device may further comprise a tray holder mounted on the slide table for movement in the direction of advancing and retracting movement of the slide table relative to the slide table, the disk tray being supported on the tray holder for movement from and to a projected position at which the disk tray is projected from the tray holder, a driving mechanism for retracting the tray holder further relative to the slide table after the slide table is retracted into the device body, and a tray stopper provided on the slide table for preventing the disk tray from being projected from the slide table, the tray stopper being located such that, when the tray holder is retracted further relative to the slide table, the tray stopper is disengaged from the disk tray. Preferably, the tray holder is located on an upper face of the slide table while a slide plate is located on a lower face of the slide table for integral movement with the tray holder such that the slide table is held between the tray holder and slide plate. The disk loading device may further comprise a spring extending between the slide plate and the slide table such that the disk tray is engaged with the tray stopper by the spring when the slide table is projected from the device body. Thus, when the tray holder is at the projected position projected from the device body, the disk tray is prevented from moving laterally from the slide table by the tray stopper.

Alternatively, the disk loading device may further comprise a tray holder mounted on the slide table for movement in the direction of advancing and retracting movement of the slide table relative to the slide table, the disk tray being supported on the tray holder for movement from and to a projected position at which the disk tray is projected from the tray holder, a driving mechanism for retracting the tray holder further relative to the slide table after the slide table is retracted into the device body, a stopper provided on the slide table such that, when the slide table is retracted into the device body, the stopper is engaged with the device body but is disengaged from the device body when the slide table is advanced from the device body, and stopper controlling means provided on the tray holder such that, when the tray holder is retracted further from the slide table, the stopper controlling means is engaged with the stopper to prevent the stopper from being disengaged from the device body. The stopper controlling means may be provided on a slide plate which is mounted for sliding movement with respect to the slide table together with the tray holder. Thus, after the disk tray is moved toward the disk driving unit, the slide table is prevented from being projected from the body frame by the stopper.

Preferably, a single disk supplying section from and to which the slide table is retracted and advanced and a cartridge mounting section in which a disk cartridge holding a plurality of disks is mounted are disposed in two stages in the device body such that the direction in which the disk tray is projected in the single disk supplying section is the same as the direction in which one of the disks is to be drawn out from the disk cartridge, and the lift table carries the disk feeding mechanism thereon and is mounted for upward and downward movement along the single disk supplying section and the cartridge mounting section. Thus, after the slide table is drawn into the device body, the disk tray is drawn out laterally from the disk carried thereon. Accordingly, while the slide table and the disk cartridge are disposed in two stages, a disk within the cartridge and the disk tray can be drawn out and fed to the disk driving unit in a similar manner by the disk feeding mechanism located on the lift table.

The disk feeding mechanism may include a pair of rollers for closely contacting with each other, at least one of the rollers being rotated in a feeding direction, and a roller spacing member for spacing the rollers from each other when the lift table is moved to a position at which the rollers are opposed to the disk tray. Preferably, the pair of rollers are located on the lift table while the roller spacing member is provided for an upper one of the rollers such that the upper roller is spaced from the other lower roller when the roller spacing member is engaged with a chassis of the device body. Since the pair of rollers are suitably spaced from each other after they are moved to the position at which they are opposed to the disk tray, a drawing in operation of a disk from the cartridge and a drawing in operation of the disk tray can be carried out by the common feeding mechanism.

Preferably, the single disk supplying section has two recessed portions formed in a concentrical relationship thereon so as to receive thereon two different types of disks having different diameters.

Preferably, the disk tray located on the slide table has a recessed portion formed therein and defined by a step having a radius substantially the same as a radius of an outer periphery of a disk and having further has a cutout formed therein which includes at least part of the step, and an inclined face is provided at and near a portion of the step opposing to the cutout. Thus, by pushing at an end of a disk received in position on the disk tray with a finger inserted into the cutout of the disk tray, the other end portion of the disk can be slidably moved on the inclined face of the step to a position above the step. Accordingly, the disk can be held by and between two fingers by applying the fingers to an edge portion of the disk lying on the step and the edge portion of the disk exposed from the cutout of the disk tray. Consequently, a disk received in the recessed portion of the disk tray can be held and removed readily from the disk tray by one hand. Further, since there is no necessity of formation of two cutouts in the disk tray in order to allow two fingers to be applied to two locations of an outer periphery of a disk received in the recessed portion of the disk tray, even where the cutout extends to a central portion of the recessed portion defined by the step of the disk tray, the strength of the disk tray can be assured sufficiently.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
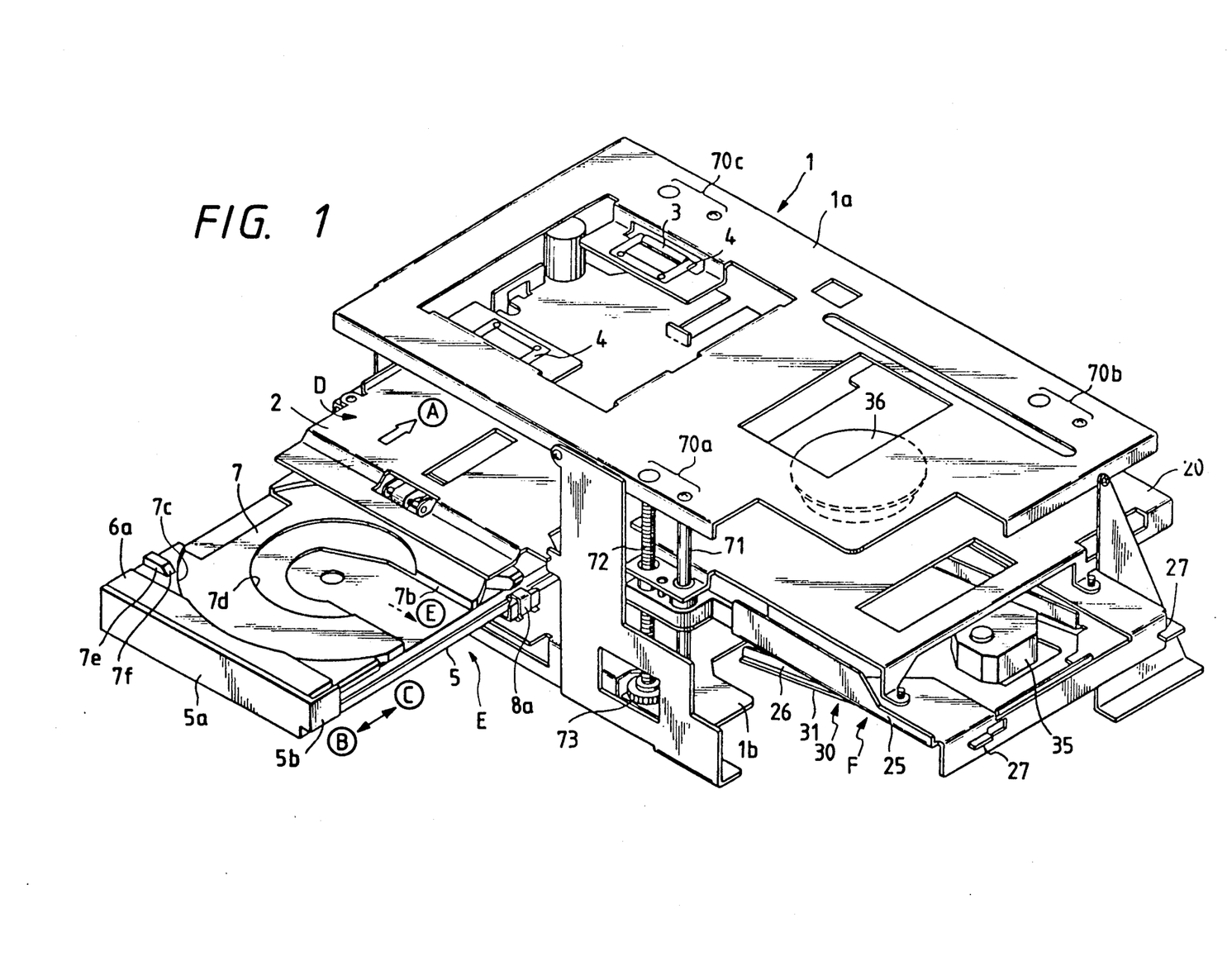
FIG. 1 is a perspective view showing an appearance of a disk player with a disk changer in which a disk loading device in accordance with the present invention is included.
Figure 2:
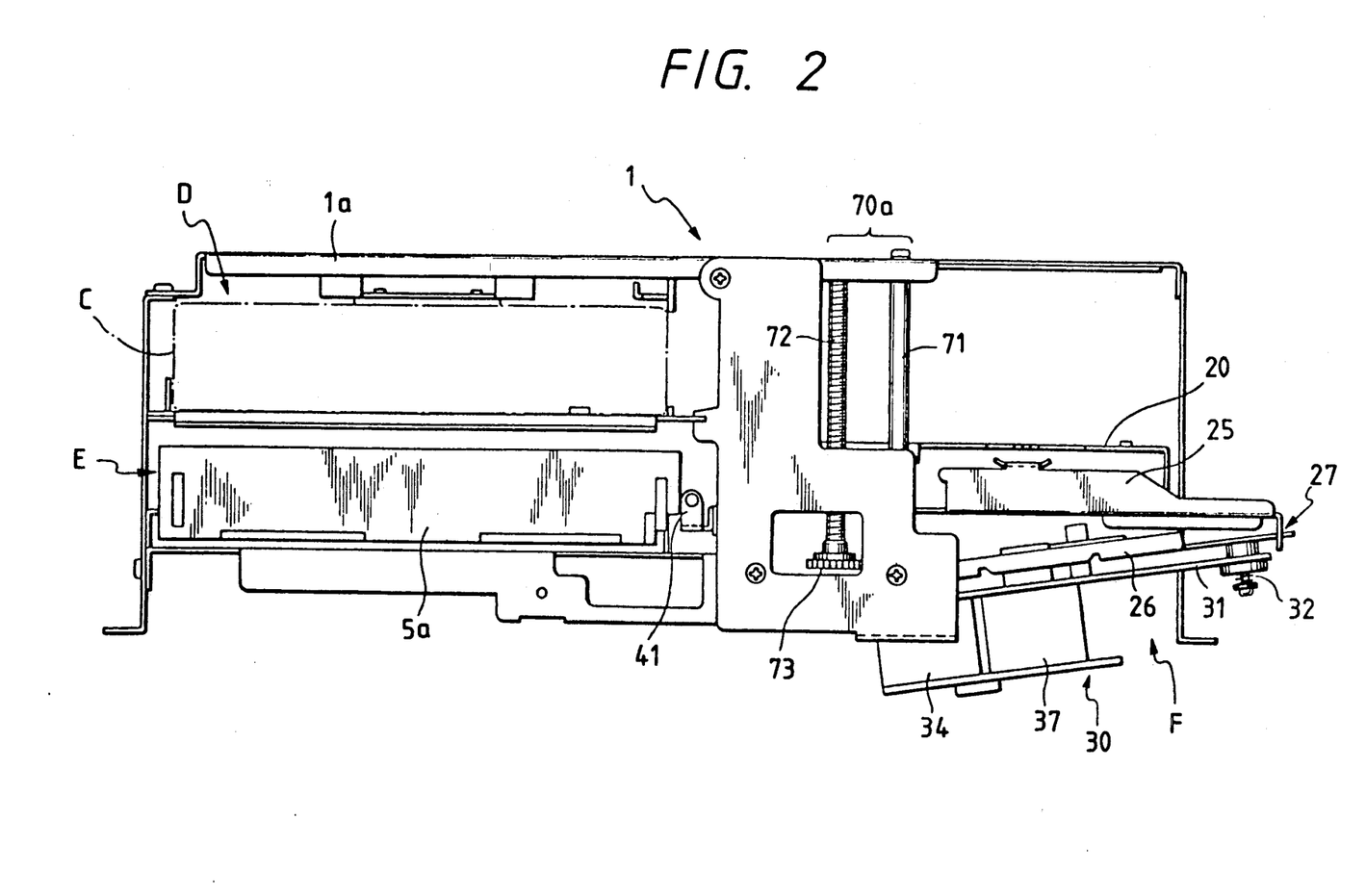
FIG. 2 is a front elevational view of the disk player of FIG. 1.
Figure 17:
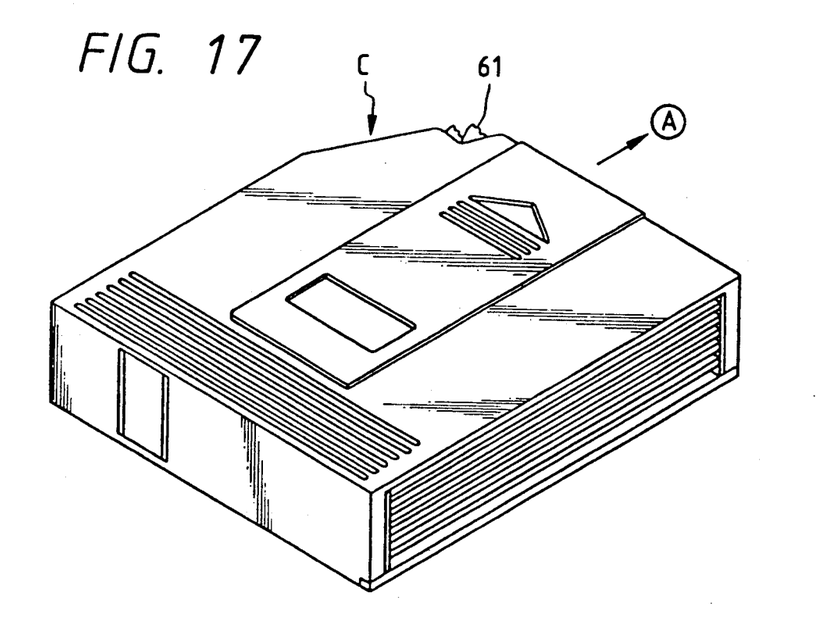
FIG. 17 is a perspective view of a disk cartridge for use with the disk player of FIG. 1.

Referring first to FIGS. 1 and 2, there is shown an entire mechanism of a compact disk player with a disk changer for use in the home. The disk player shown includes a body chassis 1 in which a cartridge mounting section D, a single disk supplying section E and a disk driving section F are arranged. Such a disk cartridge C as shown in FIG. 17 in which is accommodated a plurality of (six in the arrangement shown) compact disks is inserted in the direction indicated by an arrow mark Ⓐ into the cartridge mounting section D. A cartridge table 2 is disposed at a lower portion of the cartridge mounting section D so as to guide mounting into position a disk cartridge C into the cartridge mounting section D. A pair of pressing rollers 3 (only one is shown in FIG. 1) are mounted on a ceiling plate 1a of the body chassis 1. Each of the pressing rollers 3 is normally urged by a leaf spring 4 so that the disk cartridge C mounted in position on the mounting section D is pressed against the cartridge table 2 by the urging forces of the leaf springs 4. Descriptions of such disk cartridge and such a disk changer are found in (i) copending U.S. patent application, Ser. No. 07/568,443, entitled "Disk Loading Device for Disk Player" by S. Suzuki et al., also assigned to the assignee of the present application, filed Aug. 15, 1990; and (ii) copending U.S. patent application, Ser. No. 07/568,570, entitled "Cartridge Guiding Device for Disk Player" by S. Suzuki et al., assigned to the same assignee as the present application, filed Aug. 16, 1990. These copending applications, Ser. Nos.

07/568,433 and 07/568,570, are hereby incorporated by reference in their entireties.

The single disk supplying section E is disposed below the cartridge mounting section D. At the single disk supplying section E, a slide table 5 is advanced from and retracted into the body chassis 1. A pair of tray holders 6a and 6b are located on the slide table 5, and a disk tray 7 is supported on the tray holders 6a and 6b. The disk tray 7 is constructed to receive disks having different diameters, such as a compact disk or a "single" compact disk. A compact disk or the like placed on the disk tray 7 is supplied into the body chassis 1 by the retracting movement of the slide table 5.

Meanwhile, three lifting mechanisms 70a, 70b and 70c are located in the body chassis 1 as shown in FIGS. 1 and 2. Each of the lifting mechanisms 70a, 70b and 70c is composed of a guide shaft 71, a lifting screw 72 and a gear 73 secured to a lower end of the lifting screw 72. The gears 73 of the lifting mechanisms 70a to 70c are driven to rotate in a synchronized relationship by a driving mechanism (not shown) provided on a lower face of a bottom plate 1b of the body chassis 1.

The disk driving section F is driven to move upwardly or downwardly in the body chassis 1 by the lifting mechanisms 70a to 70c.

Figure 3:
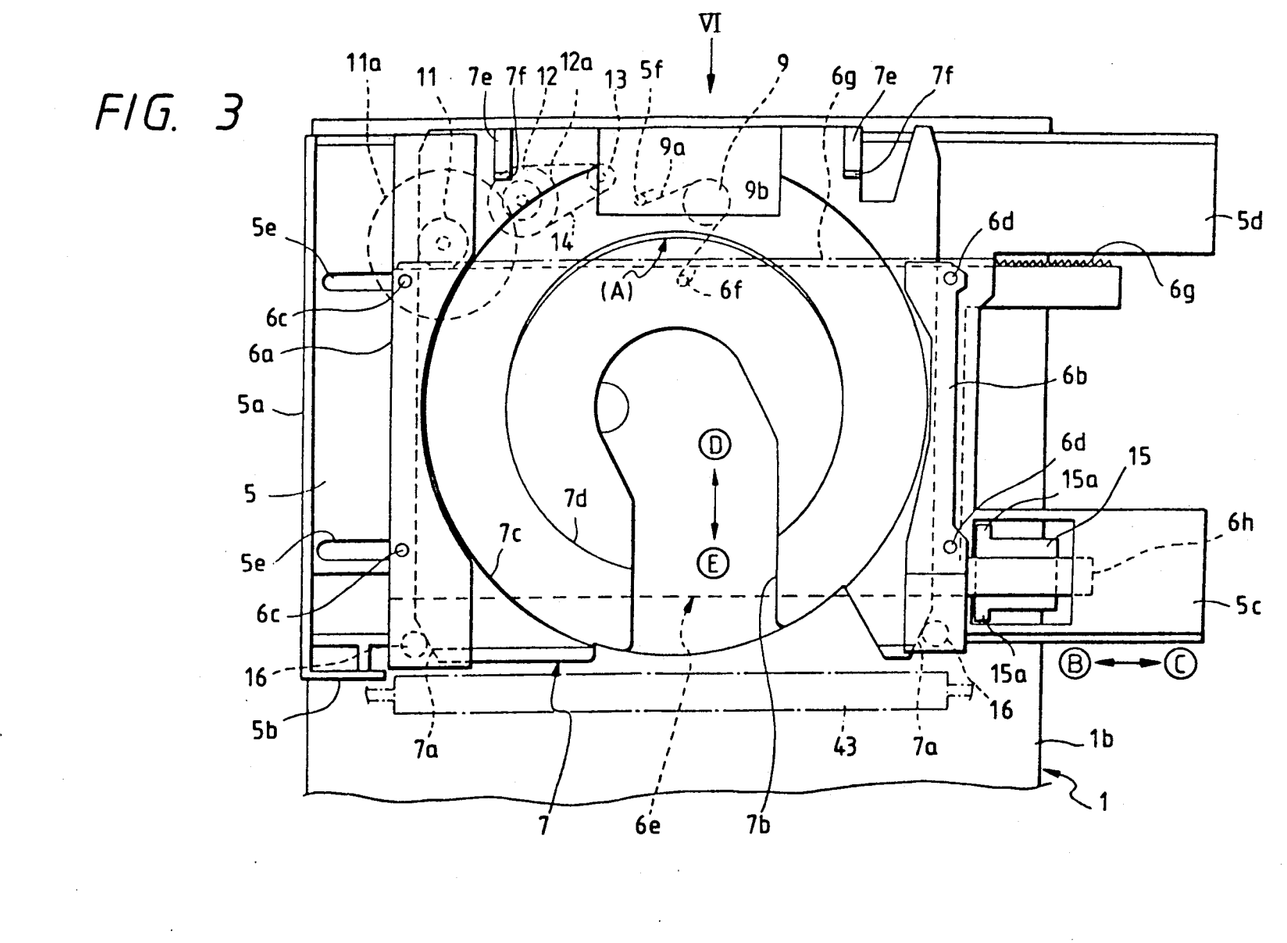
FIG. 3 is a plan view showing a moving section for a disk tray shown in the disk player of FIG. 1.
Figure 4:
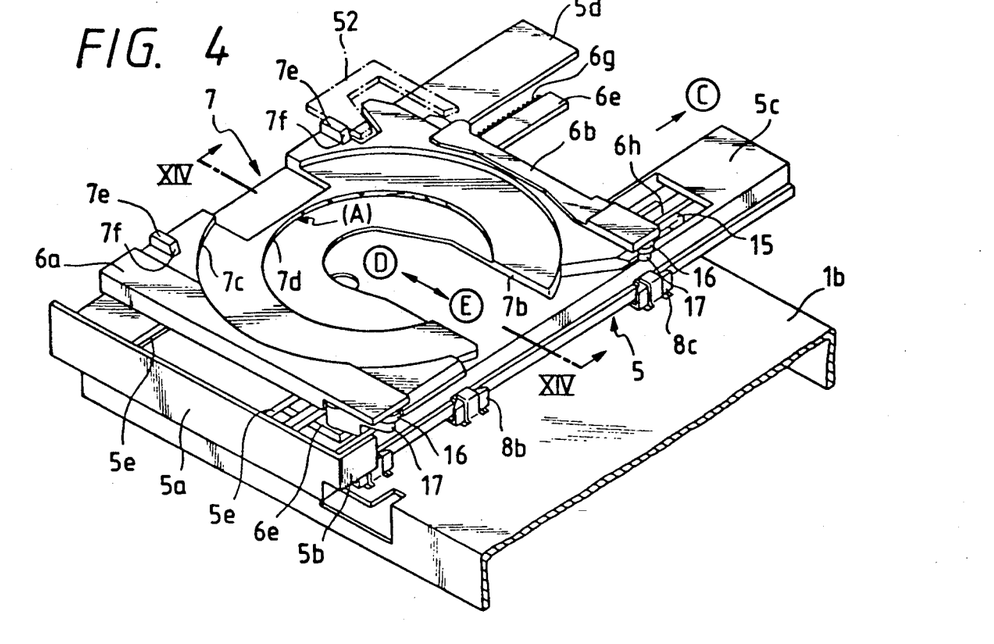
FIGS. 4 and 5 are perspective views showing the disk tray of FIG. 3 in different supporting conditions.

Referring to FIGS. 1 and 4, three guide members 8a, 8b and 8c are located in a row on an upper face of the bottom plate 1b of the body chassis 1. It is to be noted that the guide member 8a at the frontmost location shown in FIG. 1 is omitted in FIG. 4. Though not shown, similar guide members are located in another row in an opposing relationship to the guide members 8a, 8b and 8c, and the slide table 5 is guided at the opposite side edges thereof by the guide members 8a, 8b and 8c and the opposing guide members for sliding movement in the directions indicated by a double-sided arrow mark (B)-(C). In FIG. 1, the slide table 5 is shown at a position in which it is projected outwardly in the direction of the arrow mark (B) from the body chassis 1 while it is shown, in FIGS. 3 and 4, at another position in which it is retracted inwardly in the direction of the arrow mark (C) in the inside of the body chassis 1.

Figure 5:
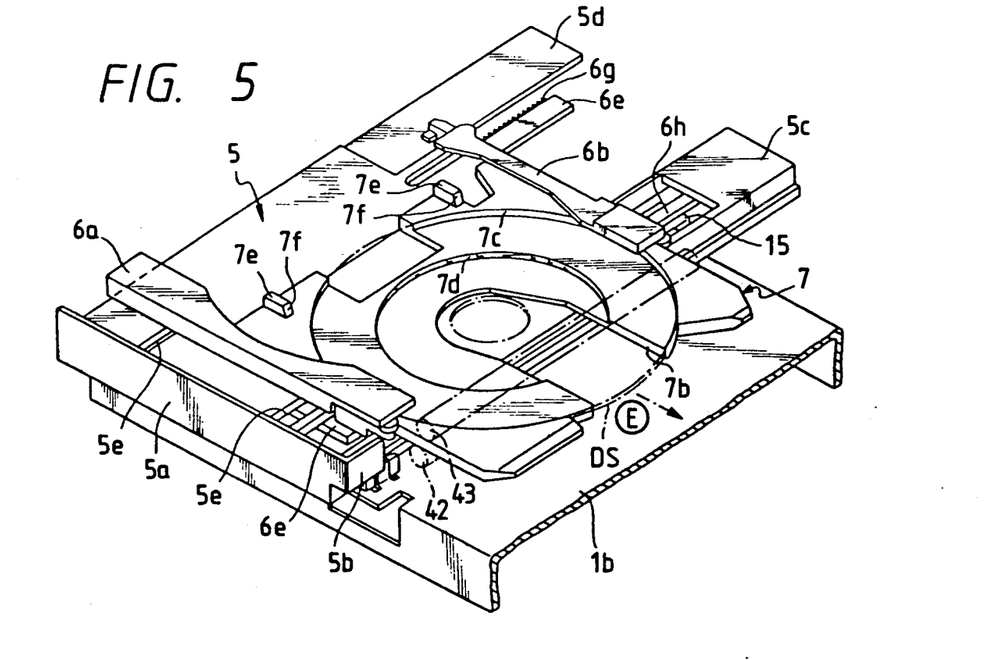

The slide table 5 has a front side plate 5a extending upwardly from a front end thereof and having a perpendicularly extending tray stopper 5b formed at a right-hand end thereof. A pair of rearward projections 5c and 5d are formed at a rear end edge of the slide table 5 in the direction of the arrow mark (C). The tray holders 6a and 6b are mounted in an opposing relationship on the slide table 5 such that they may move in the directions of the arrow marks (B)-(C) relative to the slide table 5 while maintaining the distance between them. In particular, referring to FIGS. 3 and 6, a pair of projections 6c extend downwardly from a lower face of the tray holder 6a and through a pair of elongated holes 5e 5 formed in the slide table 5 to and farther than the lower face of the slide table 5. Similarly, another pair of projections 6d extend downwardly from a lower face of the tray holder 6b and through another pair of similar elongated holes formed in the slide table 5 to and farther than the lower face of the slide table 5. A slide plate 6e is mounted on the lower face of the slide table 5, and the projections 6c and 6d of the tray holders 6a and 6b are secured to the slide plate 6e. In this manner, the tray holders 6a and 6b disposed on the upper face of the slide table 5 are integrally connected to the slide plate 6e disposed on the lower face of the slide table 5, and the tray holders 6a and 6b and the slide plate 6e can be slidably moved in the directions of the arrow marks (B)-(C) relative to the slide table 5 under the guidance of the elongated holes 5e and similar elongated holes formed in the slide table 5. In FIGS. 3, 4 and 5, the tray holders 6a and 6b are shown at positions after they are moved in the direction of the arrow mark (C) relative to the slide table 5.

Referring to FIG. 3, a torsion spring 9 extends between the slide table 5 and the slide plate 6e. The torsion spring 9 has an arm 9a anchored at a supporting pin 5f on the lower face of the slide table 5 and has another arm anchored at another supporting pin 6f on the upper face of the slide plate 6e. In FIG. 3, the slide plate 6e and tray holders 6a and 6b are shown at a limit position thereof after they are moved in an integral relationship in the direction of the arrow mark (C) relative to the slide table 5. At the limit position, the slide plate 6e and tray holders 6a and 6b are urged in the direction of the arrow mark (C) with respect to the slide table 5 by the torsion spring 9. Alternatively, when the slide plate 6e and tray holders 6a and 6b are moved in the direction of the arrow mark (B) relative to the slide table 5 to another position shown in FIG. 1, the point of force of the torsion spring 9 is turned over so that the slide plate 6e and tray holders 6a and 6b are now urged reversely in the direction of the arrow mark (B) with respect to the slide table 5. The torsion spring 9 thus acts as a center-over or toggle spring.

A rack 6g is formed on an upper side face, of the slide plate 6e (FIG. 3). A drive gear 11 is mounted on the upper face of the bottom plate 1a of the body chassis 1 and held in meshing engagement with the rack 6g. A large diameter gear 11a is formed in an integral relationship on the drive gear 11 and held in meshing engagement with a speed reducing gear 12. A follower pulley 12a is formed in an integral relationship on the speed reducing gear 12, and a belt 14 extends between the follower pulley 12a and a drive pulley 13 which is driven by a motor not shown in FIG. 3. Thus, power of the motor is transmitted to the drive gear 11 by way of the belt 14 and speed reducing gear 12. By rotation of the drive gear 11, the slide plate 6e on which the rack 6g is formed and the tray holders 6a and 6b integrated with the slide plate 6e are moved in the direction indicated by the arrow mark (B) or (C). Here, in case the slide table 5 is projected in the direction of the arrow mark (B) as seen in FIG. 1, the slide plate 6e at the limit position in the direction of the arrow mark (B) is urged in the direction of the arrow mark (B) by the torsion spring 9 and the slide plate 6e engages with and is stopped by the front slide plate 5a of the slide table 5. Then, when the slide plate 6e and tray holders 6a and 6b are driven in the direction of the arrow mark (C) from the position by way of the rack 6g by the power of the motor, the slide table 5 is moved together with the tray holder 6a in the direction of the arrow mark (C) while the tray 6a remains in engagement with the front side plate 5a of the slide table 5 as shown in FIG. 1. Then, after the slide table 5 is retracted into the inside of the body chassis 1 until it is engaged with a stopper "not shown" in the direction of the arrow mark (C), the slide plate 6e and tray holders 6a and 6b are further moved in the direction of the arrow mark (C) by continued rotation of the drive gear 11. Consequently, the slide plate 6e is moved in the direction of the arrow mark (C) relative to the slide table 5 in a stopped condition so that the tray holder 6a is spaced away from the front side plate 5a of the slide table 5 as seen in FIGS. 3 and 4 and the point of force of the torsion spring 9 is turned over. Consequently, even if the power of the motor is interrupted thereafter, the slide plate 6e and tray holders 6a and 6b are moved to the limit position in the direction of the arrow mark Ⓒ on the slide table 5 by the urging force of the torsion spring 9 acting to urge the slide plate 6e in the direction of the arrow mark Ⓒ with respect to the slide table 5.

Figure 11:
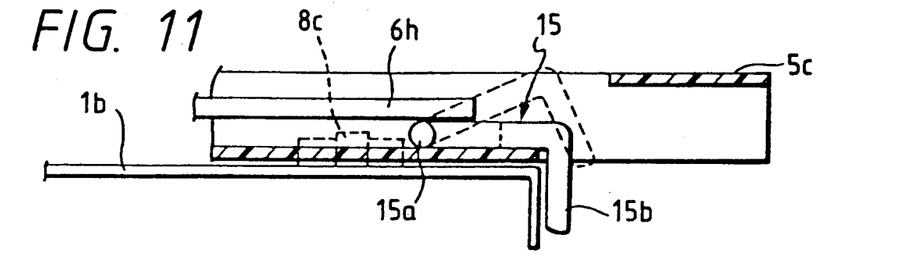
FIG. 11 is a sectional view of the mounting portion of FIG. 10.
Figure 12:
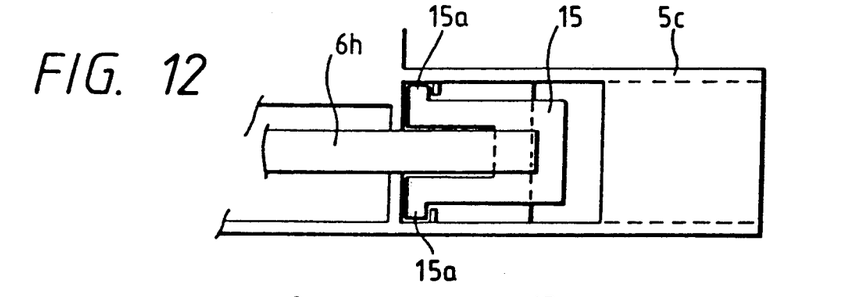
FIG. 12 is a plan view showing the stopper of FIG. 10 in a restrained condition.
Figure 13:
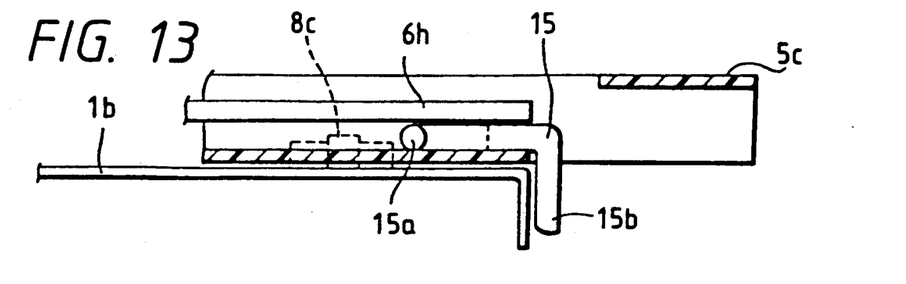
FIG. 13 is a sectional view of the stopper of FIG. 12.

Referring now to FIGS. 3 and 10 to 13, a stopper 15 is mounted on the rearward projection 5c extending rearwardly from the slide table 5. A pair of support projections 15a are formed in an integral relationship at the opposite sides of a base portion of the stopper 15 and received in the rearward projection 5c of the slide table 5 so that the stopper 15 may be pivoted around a common axis of the support portions 15a thereof on the slide table 5. The stopper 15 has an end portion 15b which extends laterally downwardly as seen in FIG. 11. When the slide table 5 is moved in the direction of the arrow mark Ⓒ from the position thereof shown in FIG. 1, the stopper 15 slidably moves away from the position indicated by a broken line in FIG. 11 on the bottom plate 1b of the body chassis 1. When the slide table 5 is moved to its limit position in the direction of the arrow mark Ⓒ, the stopper 15 is pivoted in the clockwise direction in FIG. 11 so that the end portion 15b thereof is engaged with a rear side face of the bottom plate 1b of the body chassis 1. The slide plate 6e has a rearwardly extending stopper controlling portion 6h formed at a rear portion thereof. Thus, when the slide plate 6e is further moved in the direction of the arrow mark Ⓒ relative to the slide table 5 now in a stopped condition, the stopper controlling portion 6h thereof moves to a position just above the stopper 15 on the projection 5c of the slide table 5 as seen in FIGS. 12 and 13 so that it restrains the stopper 15 from being pivoted upwardly from the position shown in FIG. 13. Accordingly, in this configuration, the end portion 15b of the stopper 15 cannot move away from the position at which it engages with the rear side face of the bottom plate 1b of the body chassis 1, and consequently, the slide table 5 cannot move in the direction of the arrow mark Ⓑ. In a disk discharging operation, the slide plate 6e and tray holders 6a and 6b are driven to move in the direction of the arrow mark Ⓑ by way of the rack 6g by the drive gear 11. In this instance, however, since the slide table 5 is prevented from moving in the direction of the arrow mark Ⓑ by means of the stopper 15, only the slide plate 6e and tray holders 6a and 6b are first moved in the direction of the arrow mark Ⓑ. Then, when or just before the tray holder 6a is engaged with the front side plate 5a of the slide table 5, the stopper controlling portion 6h formed on the slide plate 6e is displaced from the stopper 15 to allow the stopper 15 to return to its normal position. Then, the stopper 15 is pivoted upwardly to its normal position as indicated by the broken line in FIG. 11 by suitable means "not shown" to disengage the end portion 15b thereof from the rear side face of the bottom plate 1b of the body chassis 1. Consequently, the slide table 5 thereafter moves in the direction of the arrow mark Ⓑ by and together with the slide plate 6e driven by the drive gear 11, whereupon the end portion 15b of the stopper 15 slidably moves in the same direction on the upper face of the bottom plate 1b of the body chassis 1.

Figure 6:
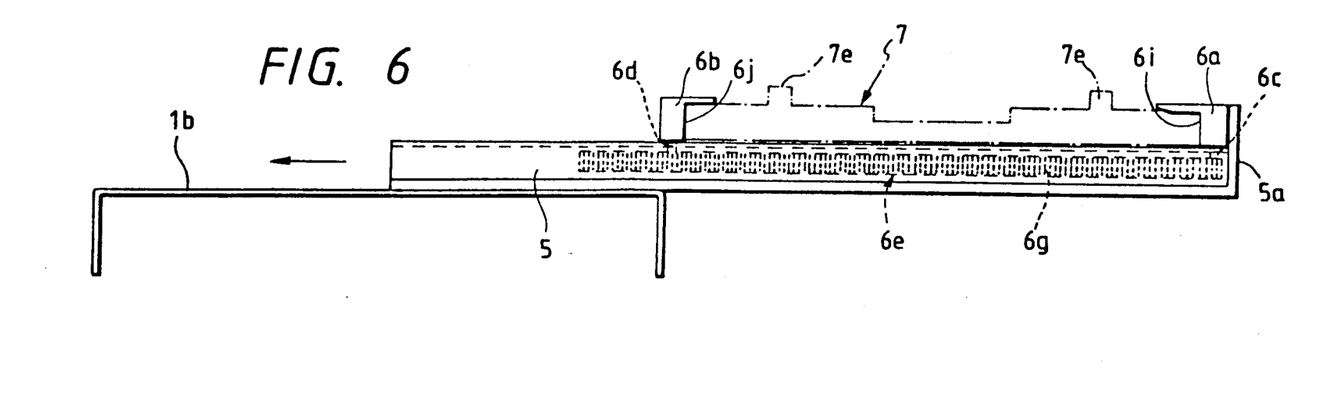
FIG. 6 is a side elevational view of the moving section of FIG. 3 as viewed in the direction indicated by an arrow mark VI of FIG. 3, with an upper face of the tray directed upwardly.

Referring to FIG. 6, supporting recesses 6i and 6j are formed on opposing faces of the tray holders 6a and 6b, respectively. The disk tray 7 is supported for sliding movement in the direction indicated by a double-sided arrow mark Ⓓ-Ⓔ in FIG. 4, that is, in a direction perpendicular to the direction of advancing and retracting movement of the slide table 5, by the supporting recesses 6i and 6j of the tray holders 6a and 6b.

A pair of inclined faces 7a are formed at the opposite end portions of the right-hand end of the disk tray 7 as seen in FIG. 3. Meanwhile, a pair of levers 17 are supported for pivotal motion on the slide plate 6e, and a pressing roller 16 is mounted for rotation around an axis thereof on each of the levers 17 as shown in FIG. 4. Each of the levers 17 is normally urged by a spring not shown so that the pressing roller 16 thereon may be resiliently pressed against a corresponding one of the inclined faces 7a of the disk tray 7. When the disk tray 7 is drawn out a little from the tray holders 6a and 6b, it is urged to be moved back in the direction of the arrow mark Ⓓ through engagement of the inclined faces 7a thereof by the pressing rollers 16 on the levers 17. On the other hand, when the disk tray 7 is drawn out by a distance greater than a predetermined distance, the pressing rollers 16 on the levers 17 are displaced from the inclined faces 7a of the disk tray 7 and now engaged with and rolled on the contiguous opposite side faces of the disk tray 7.

The disk tray 7 has a cutout 7b formed from an end in the direction of the arrow mark Ⓔ to a central portion thereof. The cutout 7b is formed in order to allow, when a disk taken out from the disk tray 7 is clamped and rotated as hereinafter described, an optical pickup which will be hereinafter described to move in a radial direction of the disk opposite a record surface of the disk to effect a signal reading operation of the disk. The disk tray 7 further has a recessed portion defined by a step 7c of a large diameter on an upper face thereof and another recessed portion defined by another step 7d of a small diameter located on the inner side of the former recessed portion. Thus, a compact disk can be mounted in position in the recessed portion of the disk tray 7 defined by the large diameter step 7c while another disk having a different smaller diameter such as a single compact disk can be mounted in position in the recessed portion defined by the small diameter step 7d.

Figure 14:
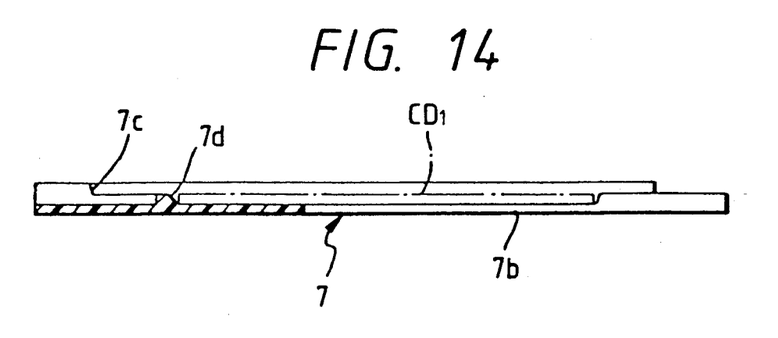
FIG. 14 is a sectional view taken along line XIV—XIV of FIG. 4 showing the disk tray.
Figure 15:
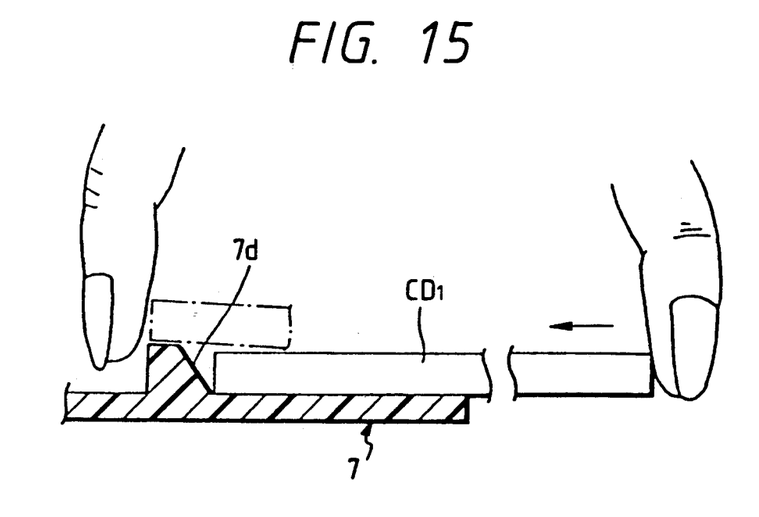
FIG. 15 is an enlarged view of part of FIG. 14 illustrating an operation to remove a disk.
Figure 16:
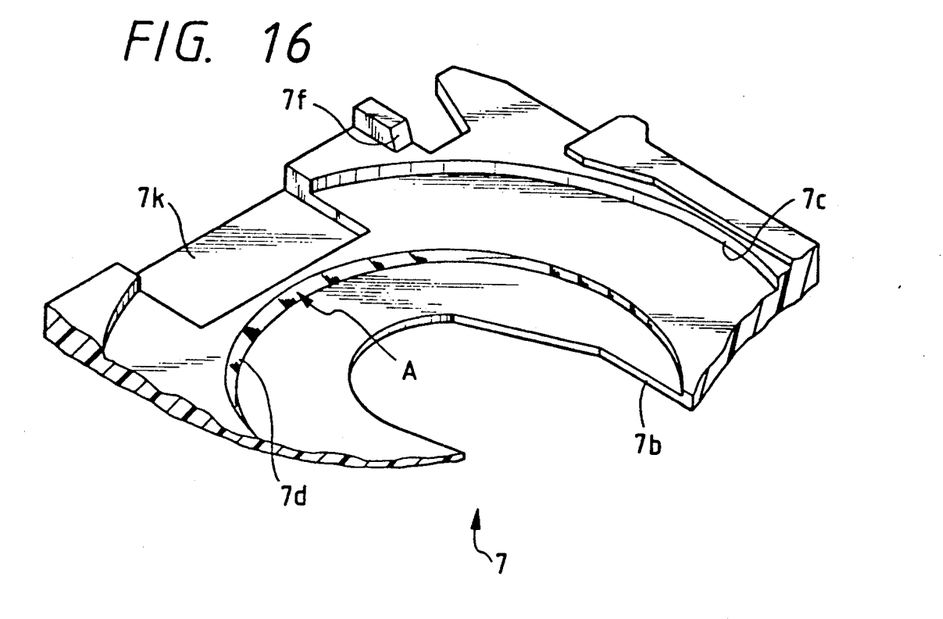
FIG. 16 is a perspective view of the disk tray shown in FIG. 15.

Referring now to FIGS. 14 to 16, the small diameter step 7d of the disk tray 7 presents, at least at and near a location A thereof (FIG. 16) an inclined face opposing to or away from the cutout 7b "FIGS. 3 and 4". Accordingly, when it is intended to remove a smaller diameter disk $CD_1$, such as a single compact disk placed in the recessed portion of the disk tray 7 defined by the small diameter step 7d, a finger is inserted into the cutout 7b as seen in FIG. 15 and push at an outer periphery of the disk $CD_1$ toward the location A of the step 7d. Thereupon, the other end portion of the disk $CD_1$ is guided along the inclined face of the step 7d to such a position as indicated in phantom in FIG. 15 at which the disk $CD_1$ is picked up readily by two fingers of a hand.

Referring to FIG. 4, the disk tray 7 further has a pair of protuberances 7e formed at rear end portions thereof. Each of the protuberances 7e has an inclined face 7f formed at a front end thereof.

Figure 7:
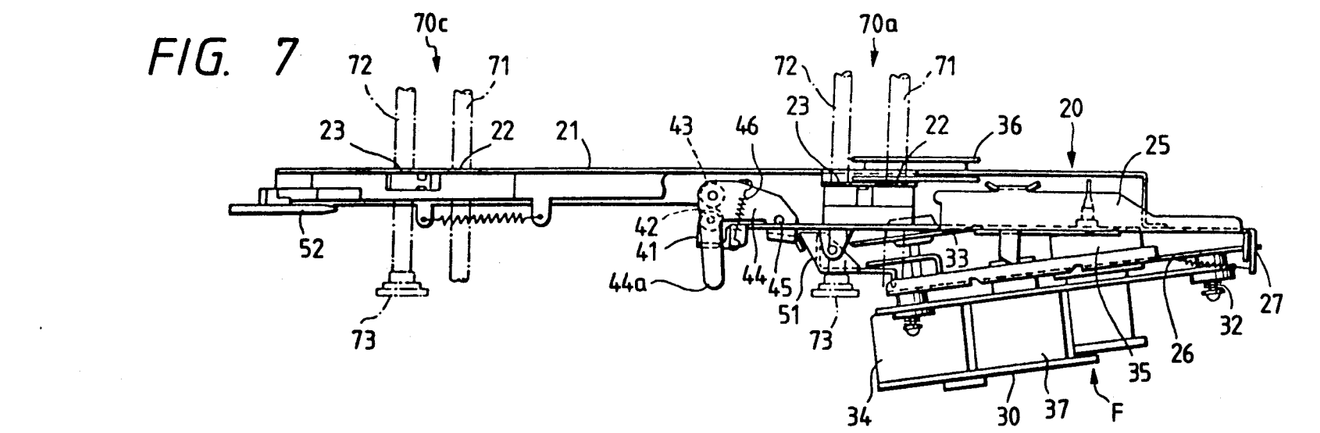
FIG. 7 is a front elevational view showing a disk driving section of the disk player of FIG. 1.

Referring now to FIGS. 1 and 7, a lift table 20 is located in the disk driving section F. A disk drawing out portion 21 extends linearly on the left-hand side of the lift table 20. The lift table 20 has a guide hole 22 and an adjacent female threaded hole 23 formed at each of portions thereof corresponding to the lifting mechanisms 70a to 70c. The guide shafts 71 of the lifting mechanisms 70a to 70c are fitted in the guide holes 22 of the lift table 20 while the lifting screws 72 are screwed in the female threaded holes 23. When the three gears 73 are driven in a synchronized relationship by the driving mechanism provided on the lower face of the bottom plate 1b of the body chassis 1 to rotate the lifting screws 72 of the lifting mechanisms 70a to 70c in a synchronized relationship, the lift table 20 shown in FIG. 7 is driven to move upwardly or downwardly in the body chassis 1. By such upward or downward movement of the lift table 20, it can be positioned to the same level as any one of the disks in the disk cartridge C described hereinabove or to another position at which a disk placed on the disk tray 6 can be taken out from the disk tray 6.

Referring now to FIGS. 2 and 7, an intermediate table 25 is located a predetermined distance below the lift table 20 in the disk driving section F. A clamp chassis 26 is disposed below the intermediate table 25. The clamp chassis 26 is held in engagement with the intermediate table 25 such that a right-hand end in FIGS. 2 and 7 thereof acts as a fulcrum 27 of pivotal motion of the clamp chassis 26. Thus, the clamp chassis 26 is rocked upwardly or downwardly around the fulcrum 27 with respect to the intermediate table 25. A disk reproducing unit 30 is mounted at a lower portion of the clamp chassis 26. A pickup chassis 31 of the disk reproducing unit 30 is mounted on the clamp chassis 26 by way of a damper supporting mechanism 32. A turntable 33 and a spindle motor 34 for rotating the turntable 33, an optical pickup 35 having an objective lens (not shown), and a scanning motor 37 for moving the optical pickup 35 along a record surface of a disk are carried on the pickup chassis 31. Meanwhile, a clamper 36 is mounted on the lift table 20 in opposite the turntable 33.

Figure 8:
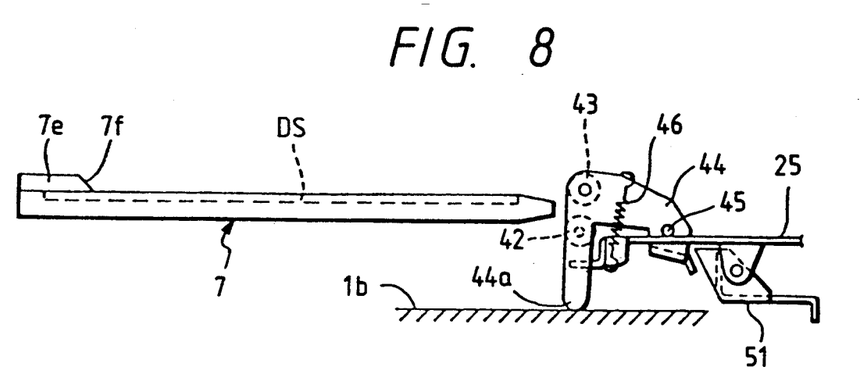
FIGS. 8 and 9 are partial front elevational views showing part of the disk driving section of FIG. 7 in different positions.

Referring to FIG. 7, a bracket 41 is formed at a left-hand end in FIG. 7 of the intermediate table 25 of the disk driving section F by laterally bending part of the intermediate table 25 upwardly, and a lower roller 42 which serves as a component of a disk supplying mechanism is supported on the bracket 41. A pivotal bracket 44 is supported on the intermediate table 25 by means of a shaft 45, and an upper roller 43 is supported on the pivotal bracket 44. The pivotal bracket 44 is normally urged in the counterclockwise direction in FIG. 7 by a spring 46 so that the upper roller 43 may be resiliently pressed against the lower roller 42. The upper roller 43 is connected to be rotated in the counterclockwise or clockwise direction by a motor driving mechanism (not shown) carried on the lift table 20. When the upper roller 43 is rotated in the counterclockwise direction in FIG. 7 by the motor driving mechanism, the disk tray 7 on which a disk is carried or a disk discharged from the disk cartridge C is held between the upper and lower rollers 42 and 43 and is fed into the turntable 33. Alternatively when the upper roller 43 is rotated in the clockwise direction, the disk tray 7 or a disk is taken out of the turntable 33 by the roller 43. Meanwhile, the pivotal bracket 44 on which the upper roller 43 is supported has an arm 44a formed thereon which extends downwardly toward the bottom plate 1b of the body chassis 1. When the disk tray 7 in the single disk supply section E is to be drawn out, the lift table 20 is moved down to its lowermost or lower limit position at which the rollers 42 and 43 are positioned laterally of the disk tray 7. At a final stage of the downward movement of the lift table 20, an end of the arm 44a of the pivotal bracket 44 is engaged with and stopped by the upper face of the bottom plate 1b of the body chassis 1 as shown in FIG. 8 so that the pivotal bracket 44 is pivoted in the clockwise direction in FIG. 8 to space the upper roller 43 away from the lower roller 42. The distance between the two rollers 42 and 43 thus spaced from each other permits the rollers 42 and 43 to hold the disk tray 7 therebetween in spite of the thickness of the disk tray 7 and to feed the same toward the disk driving section F.

An actuating lever 51 is located on the right in FIG. 7 of the pivotal bracket 44 on the intermediate table 25. The actuating lever 51 is driven, after the disk tray 7 or a disk is transferred to the turntable 33, to pivot in the counterclockwise direction from the position shown in FIG. 7 by a driving mechanism "not shown." Upon such counterclockwise pivotal motion of the actuating lever 51, the clamp chassis 26 is pivoted in the clockwise direction by the actuating lever 51 to lift the turntable 33 until the disk is held between the turntable 33 and the clamper 36. If the disk tray 7 is fed in the disk driving section F, a disk is lifted from the disk tray 7 by the turntable 33 and clamped between the turntable 33 and the clamper 36. Meanwhile, when the actuating lever 51 is pivoted in the counterclockwise direction, the pivotal bracket 44 is pivoted in the clockwise direction in FIG. 7 by the actuating lever 51 so that the upper roller 43 is displaced upwardly from the lower roller 42 when the disk is clamped between the turntable 33 and the clamper 36.

A discharging member 52 is located at a left-hand end in FIG. 7 of the lift table 20. When a disk placed on the disk tray 7 is to be played, the discharging member 52 is moved, by downward movement of the lift table 20, to a position at which it is opposite the rear of the disk tray 7 as seen in FIG. 4, and then the discharging member 52 is moved to the right in FIG. 4 to push out the disk tray 7 in the direction indicated by the arrow mark Ⓔ. Alternatively when a disk within the disk cartridge C is to be played, the discharging member 52 is moved, by upward movement of the lift table 20, behind the cartridge C to a position at which it is opposite to the rear of a desired one of disks in the cartridge. Then, the discharging member 52 is moved to push one of ejectors 61 of the disk cartridge C shown in FIG. 17 thereby to push out the desired disk from the disk cartridge C.

The operation of the disk player, which is structurally described above, will be described next.

The disk player of the embodiment is constructed such that it can accept either a disk cartridge C or a single disk.

The operation of the disk player when a single disk is provided is first described.

If an operating button "not shown" is manually operated, then the motor "not shown" is energized to rotate the drive pulley 13 shown in FIG. 3 to rotate. Consequently, the drive gear 11 is rotated in the clockwise direction to move the rack 6g to the left in FIG. 3 to move the slide table 5 in the direction of the arrow mark Ⓑ together with the slide plate 6e to the position shown in FIG. 1, in which it is projected outwardly from the body chassis 1 of the disk player. During such movement, the tray holder 6a is moved to a position at which it engages with the front side plate 5a of the slide table 5 and the tray stopper 5b of the slide table 5 is opposed to an end portion in the direction of the arrow mark Ⓔ of the disk tray 7 held between the tray holders 6a and 6b of the slide table 5. Accordingly, when the slide table 5 is at the projected position in the direction of the arrow mark Ⓑ, the disk tray 7 is prevented from moving in the direction of the arrow mark Ⓔ by the tray stopper 5b.

A compact disk will be placed into the recessed portion defined by the large diameter step 7c of the disk tray 7. Alternatively, when a disk of a smaller diameter such as a single compact disk is to be played, it will be placed into the recessed portion defined by the small diameter step 7d of the disk tray 7. Then, when a loading button "not shown" is depressed, the motor is energized to rotate the drive pulley 13 shown in FIG. 3 thereby to rotate the drive gear 11 in the clockwise direction to feed the rack 6g in the direction of the arrow mark Ⓒ. Consequently, the slide plate 6e and the slide table 5 are moved in an integral relationship in the direction of the arrow mark Ⓒ while the tray holder 6a remains in a contacting condition with the front slide plate 5a of the slide table 5 as seen in FIG. 1 by the urging force of the torsion spring 9. The slide table 5 is engaged with the stopper "not shown" when it is accommodated in position into the body chassis 1. Thereafter, since the drive gear 11 still continues its rotation, the slide plate 6e and the tray holder 6a and 6b are continuously moved in the direction of the arrow mark Ⓒ while the tray holder 6a is spaced away from the front side plate 5a of the slide table 5 as seen from FIG. 3. In this instance, the disk tray 7 supported on the tray holders 6a and 6b is displaced from the tray stopper 5b of the slide table 5 so that the disk tray 7 can thereafter be moved in the direction of the arrow mark Ⓔ in the body chassis 1.

During such movement in the direction of the arrow mark Ⓒ, the stopper 15 first slidably moves on the bottom plate 1b of the body chassis 1 by movement of the slide table 5 in the direction of the arrow mark Ⓒ (in such a condition as indicated by a broken line in FIG. 11). Then, when the slide table 5 comes to its limit position in the direction of the arrow mark Ⓒ, the end portion 15b of the stopper 15 is engaged with the rear side face of the bottom plate 1b (a condition indicated by a solid line in FIG. 11). By further movement of the slide plate 6e in the direction of the arrow mark Ⓒ, the stopper controlling portion 6h of the slide plate 6e is engaged with the stopper 15 as shown in FIGS. 12 and 13 so that upward pivotal motion of the stopper 15 is thereafter prevented by the stopper controlling portion 6h to lock the slide table 5.

In a playing operation, the lifting screws 72 of the lifting mechanisms 70a to 70c are rotated to move the disk driving section F shown in FIG. 7 downwardly in the body chassis 1 together with the lift table 20. Consequently, the rollers 42 and 43 of the disk feeding mechanism come to a position at which they are laterally opposite the disk tray 7 as seen in FIG. 8. In this instance, since the lower end of the arm 44a of the pivotal bracket 44 is engaged with and stopped by the bottom plate 1b of the body chassis 1 to pivot the pivotal bracket 44 in the clockwise direction in FIG. 7, the upper roller 43 is spaced upwardly a little from the lower roller 42. Thereafter, the discharging member 52 is moved to the right in FIG. 7 by the driving mechanism "not shown" in the lifting table 20. Since the discharging member 52 is positioned in the rear of the disk tray 7 "FIG. 4" by the downward movement of the lift table 20, the disk tray 7 is pushed by the discharging member 52 to move in the direction of the arrow mark Ⓒ in FIG. 3 while it carries the disk DS thereon. Thereupon, the disk tray 7 carrying the disk DS thereon is held between the lower roller 42 and upper roller 43, and then, since the upper roller 43 is being driven to rotate in the counterclockwise direction in FIG. 8, the disk tray 7 clamped between the rollers 42 and 43 under the holding force exerted by the spring 46 is fed in the direction of the arrow mark Ⓔ by the upper roller 43 while carrying the disk DS thereon.

Then, after the disk tray 7 is fully fed into the disk driving section F, the actuating lever 51 is pivoted in the clockwise direction in FIG. 7 to move the clamp chassis 26 upwardly while at the same time the pivotal bracket 44 is pushed to pivot in the clockwise direction by the actuating lever 52 to move the upper roller 43 upwardly away from the disk tray 7. Then, only the disk DS on the disk tray 7 is lifted by the turntable 33 moved up together with the clamp chassis 26 and is clamped between the turntable 33 and the clamper 36. Then, the disk DS is rotated by the turntable 33 and played by the optical pickup 35. During such play operation, the optical pickup 35 is moved along the longitudinal direction of the cutout 7b of the disk tray 7 to read signals of the disk DS through the cutout 7b.

Figure 9:
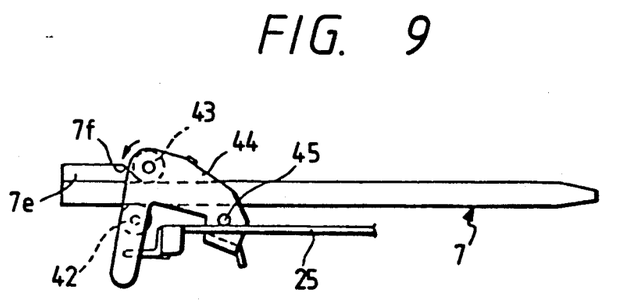
Figure 10:
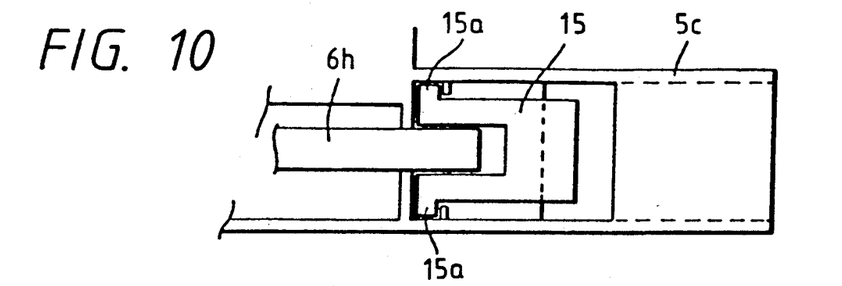
FIG. 10 is a plan view showing a mounting portion for a stopper.

When the disk tray 7 is fed in the direction of the arrow mark Ⓔ by the rollers 42 and 43, even if the disk tray 7 is fed fully into the disk driving section F, the upper roller 43 may possibly continue its counterclockwise rotation while the disk tray 7 remains held between the rollers 42 and 43 as seen in FIG. 9. In particular, although the pivotal bracket 44 is pivoted in the clockwise direction in FIG. 7 by the actuating lever 51 after the disk tray 7 has been fully fed into the disk driving section F, where the pivotal bracket 44 and the upper roller 43 are connected to be driven by a common motor as a driving source, even if the movement of the disk tray 7 is completed, the upper roller 43 may continue its rotation until it is spaced away from the disk tray 7. In this instance, if the upper roller 43 remains in engagement with the disk tray 7 after having been fully fed into the disk driving section F and still tends to continue its rotation, the upper roller 43 may possibly bite into the disk tray 7 to stop the motor. In the present embodiment, however, since the rear protuberances 7e of the disk tray 7 have the inclined faces 7f formed thereon as described hereinabove, if the upper roller 43 continues its counterclockwise rotation as seen in FIG. 9 after completion of feeding of the disk tray 7, then the upper roller 43 will ride on the inclined faces 7f. Consequently, the disk tray 7 is no more acted upon by the holding force of the upper roller 43 and the lower roller 42, and the upper roller 43 will be rotated idly at the position on the inclined surfaces 7f of the protuberances 7e of the disk tray 7. Since the holding force by the rollers 42 and 43 is cancelled and the upper roller 43 may be rotated but idly in this manner, inadvertent stopping of the motor by biting of the upper roller 43 is eliminated. In other words, where the inclined faces 7f are provided, there is no necessity of additional provision of a clutch mechanism.

Then, when the play of the disk is completed and the disk is to be discharged, the actuating lever 51 is first pivoted in the clockwise direction in FIG. 7 to move the clamp chassis 26 back in the downward direction to cancel the clamped condition of the disk DS to allow the disk DS to be returned to the position on the disk tray 7. Meanwhile, the pivotal bracket 44 is pivoted in the counterclockwise direction to hold the disk tray 7 between the upper roller 43 and the lower roller 42, and as the upper roller 43 is subsequently rotated in the clockwise direction, the disk tray 7 is moved back toward the tray holders 6a and 6b. Then, after the disk tray 7 is spaced away from the rollers 42 and 43, the returning force of the rollers 42 and 43 no more acts on the disk tray 7, but at the point of time, the pressing rollers 16 are resiliently engaged with the inclined faces 7a of the disk tray 7 as seen in FIG. 3. Consequently, the disk tray 7 is returned with certainty into the tray holders 6a and 6b by the resilient engaging forces of the pressing rollers 16.

Then, the drive gear 11 shown in FIG. 3 is rotated in the reverse direction to feed the rack 6g back in the direction of the arrow mark (B). Consequently, the slide table 5 is projected from the body chassis 1 as seen in FIG. 1. During such movement, the stopper controlling portion 6h formed on the slide plate 6e is first disengaged from the stopper 15 so that the stopper 15 is pivoted upwardly and consequently the slide table 5 is brought out of the condition in which it is locked by the stopper 15 as seen in FIGS. 12 and 13. Thereupon, the tray holder 6a is engaged with the front side plate 5a of the slide table 5. Thereafter, the slide table 5 is moved by and together with the slide plate 6e until it is projected from the body chassis 1 as seen in FIG. 1.

Then, when a disk DS such as a compact disk is received in the recessed portion defined by the step 7c of the disk tray 7, a finger will be applied to an edge portion of the disk DS exposed from the cutout 7b of the disk tray 7 while another finger such as the thumb is applied to another edge portion of the disk DS exposed from a recessed portion 7k (refer to FIG. 16) formed across the step 7c at a portion of the disk tray 7 remote from the cutout 7b, and the disk DS will be held from the opposite sides thereof by and between the two fingers and removed from the disk tray 7.

Alternatively, in case a small diameter disk $CD_1$ such as a single compact disk is received in the recessed portion defined by the step 7d of the disk tray 7, a finger will first be inserted into the cutout 7b of the disk tray 7 and applied to an edge portion of the disk $CD_1$ exposed from the cutout 7b. Then, if the edge portion of the disk $CD_1$ is pushed in the direction indicated by an arrow mark in FIG. 15 with the finger, then the other end portion of the disk $CD_1$ will slidably move on the inclined face of the step 7d formed at and near the location A described hereinabove so that it will ride onto the step 7d. Thus, different fingers will be applied to an edge portion of the disk $CD_1$ lying on the step 7d and the edge portion of the disk $CD_1$ exposed from the cutout 7b of the disk tray 7 to hold the disk $CD_1$ between the fingers. Consequently, the disk $CD_1$ can be held readily by one hand and accordingly can be removed from the disk tray 7 by one hand.

When one of disks in the disk cartridge C is to be played, the lift table 20 is moved up to a position next the disk cartridge C. Upon such upward movement of the lift table 20, the arm 44a of the pivotal bracket 44 is spaced away from the bottom plate 1b of the body chassis 1 as shown in FIG. 7 so that the upper roller 43 is brought into close contact with the lower roller 42 by the force of the spring 46. When the lift table 20 comes to a position at which it is opposed to a desired one of disks in the disk cartridge C, the lift table 20 is stopped, and then the discharging member 52 is moved to push the ejector 61 of the desired disk of the disk cartridge C shown in FIG. 17 to discharge the desired disk from the disk cartridge C. Then, the thus discharged disk is inserted and held between the upper roller 43 and lower roller 42, and as the upper roller 53 is rotated, the disk is forwarded into the disk driving section F in which the disk is reproduced subsequently.

It is to be noted that, while the disk tray 7 in the embodiment described above has two recessed portions formed therein which have different diameters so that two different types of disks may be received therein, the present invention can be applied to a disk player which includes a disk tray having a single recessed portion formed therein for receiving a disk of only one type.

Further, the present invention may be applied to a disk player which does not include a mounting section for a disk cartridge but only includes a disk tray.

Having now fully described the invention, it will be apparent to one of ordinary skill in the art that many changes and modifications can be made thereto without departing from the spirit and scope of the invention as set forth herein.

What is claimed is:

1. A disk loading device for a disk player, comprising:
   a slide table mounted for advancing and retracting movement from and into a device body;
   a disk tray supported for movement independently from said slide table, said disk tray having a disk receiving portion formed on an upper face thereof for receiving a disk;
   a mechanism disposed adjacent said disk tray for drawing out said disk tray;
   a disk driving unit for driving said disk on said disk tray drawn out by said drawing out mechanism;
   a tray holder mounted on said slide table for movement in the direction of advancing and retracting movement of said slide table relative to said slide table, said disk tray being supported on said tray holder;
   a driving mechanism for retracting said tray holder further relative to said slide table after said slide table is retracted into said device body; and
   a tray stopper provided on said slide table for limiting motion of said disk tray relative to said slide table, said tray stopper being located such that, when said tray holder is retracted further relative to said slide table, said tray stopper is disengaged from said disk tray.

2. A disk loading device for a disk player according to claim 1, further comprising a slide plate wherein said tray holder is located on an upper face of said slide table and said slide plate is located on a lower face of said slide table for integral movement with said tray holder such that said slide table is held between said tray holder and said slide plate.

3. A disk loading device for a disk player according to claim 2, further comprising a spring extending between said slide plate and said slide table such that said disk tray is engaged with said tray stopper by said spring when said slide table is advanced from said device body.

4. A disk loading device for a disk player according to claim 1, wherein when said slide table is retracted into said device body, a stopper on said slide table is engaged with said device body but is disengaged from said device body when said slide table is advanced from said device body, said disk loading device further comprises stopper controlling means for preventing said stopper from being disengaged from said device body when said tray holder is retracted further from said slide table.

5. A disk loading device for a disk player according to claim 4, wherein said stopper controlling means is provided on a slide plate which is mounted for sliding movement with respect to said slide table together with said tray holder.

6. A disk loading device for a disk player according to claim 1, wherein:

said device body comprises a single disk supplying section from and to which said slide table is retracted and advanced; and a cartridge mounting section for mounting a disk cartridge holding a plurality of disks, said single disk supplying section and said disk cartridge mounting section are disposed in two stages in said device body such that the direction in which said disk tray is drawn out from said single disk supplying section is the same as the direction in which a disk is to be drawn out from said disk cartridge;

said disk drawing out mechanism comprises a mechanism for drawing out a selected one of said disk tray from said single disk supplying section and a disk from said cartridge mounting section; and said disk loading device further comprising:

a lift table for carrying said disk drawing out mechanism and said disk driving unit thereon; and means for moving said lift table upwardly and downwardly along said single disk supplying section and said cartridge mounting section so as to alternatively position said disk drawing out mechanism, and said disk driving unit for playing a disk on said disk tray and a disk from said disk cartridge.

7. A disk loading device for a disk player according to claim 6, wherein said disk drawing out mechanism includes:

a pair of rollers, at least one of said rollers being rotatable in a drawing out direction, and a roller spacing member for spacing said rollers from each other when said lift table is moved to a position at which said rollers are opposed to said disk tray, and for bringing said rollers into proximity to one another when said lift table is moving to a position at which said rollers are opposed to said disk cartridge.

8. A disk loading device for a disk player according to claim 7, wherein said pair of rollers are located on said lift table while said roller spacing member is provided for the upper one of said rollers such that the upper roller is spaced from the other lower roller when said roller spacing member is engaged with a chassis of said device body.

9. A disk loading device for a disk player according to claim 1, wherein said disk receiving portion has a plurality of recessed portions formed in a concentrical relationship thereon so as to receive thereon a disk having a diameter corresponding to any one of said recessed portions.

10. A disk loading device for a disk player according to claim 1, wherein said disk tray located on said slide table has a recessed portion formed therein and defined by a step having a substantially same radius as a radius of an outer periphery of a disk and further has a cutout formed therein which includes at least part of said step, and an inclined face is provided at and near a portion of said step opposing to said cutout.

11. A disk loading device as in claim 1, further comprising a lift table for carrying said disk driving unit thereon and moving said disk driving unit upwardly and downwardly.

12. A disk loading device as in claim 6, wherein said disk drawing out mechanism is carried on said lift table.

13. A disk loading device for a disk player as in claim 1, wherein said disk tray is movable in a direction transverse to said direction of advancing and retracting movement of said slide table.

14. A disk loading device for a disk player as in claim 1, wherein said drawing out mechanism further comprises a mechanism for pushing out said disk tray.

15. A disk loading device for a disk player as in claim 6, wherein said disk drawing out mechanism comprises a mechanism for pushing out a selected one of said disk tray from said single disk supplying section and a disk from said cartridge mounting section.

* * * * *